United States Patent
Hu et al.

(10) Patent No.: US 9,091,795 B2
(45) Date of Patent: Jul. 28, 2015

(54) LIGHT GUIDE PLATE FOR 3D DISPLAYING

(75) Inventors: Chechang Hu, Shenzhen (CN); Hu He, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 414 days.

(21) Appl. No.: 13/579,282

(22) PCT Filed: Jun. 28, 2012

(86) PCT No.: PCT/CN2012/077805
§ 371 (c)(1),
(2), (4) Date: Aug. 15, 2012

(87) PCT Pub. No.: WO2013/185384
PCT Pub. Date: Dec. 19, 2013

(65) Prior Publication Data
US 2013/0336009 A1    Dec. 19, 2013

(30) Foreign Application Priority Data

Jun. 14, 2012 (CN) .......................... 2012 1 0196517

(51) Int. Cl.
G09G 5/10 (2006.01)
F21V 8/00 (2006.01)
(52) U.S. Cl.
CPC ............ *G02B 6/0011* (2013.01); *G02B 6/0038* (2013.01); *G02B 6/0058* (2013.01)

(58) Field of Classification Search
CPC ... G02B 6/0011; G02B 6/0038; G02B 6/0058
USPC .............. 349/65; 362/615, 619, 620; 385/146
See application file for complete search history.

(56) References Cited

U.S. PATENT DOCUMENTS

2012/0098875 A1* 4/2012 Shinkai et al. ................ 362/613

FOREIGN PATENT DOCUMENTS

CN          102081186 A     6/2011

* cited by examiner

*Primary Examiner* — Stephen F Husar
(74) *Attorney, Agent, or Firm* — Cheng-Ju Chiang

(57) ABSTRACT

A light guide plate includes upper microstructures forming an upper surface. The upper microstructures are distributed in a successive convex-concave alternating arrangement in a direction perpendicular to propagation direction of light in the light guide plate. The light guide plate is divided according to the distance from the light source in the light propagation direction into a proximal side and a remote side. With H indicating height of shape features of the upper microstructures and P indicating spacing between the shape features of the upper microstructures, the shape features of the upper microstructures show a distribution that is variable in the light propagation direction in such a way that the variation satisfies the condition that aspect ratio H/P of the upper microstructures at the proximal side of the light guide plate is less than aspect ratio H/P of the upper microstructures at the remote side of the light guide plate.

17 Claims, 4 Drawing Sheets

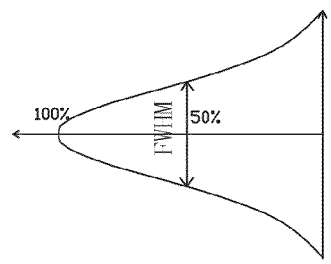
Fig. 4 (Prior Art)
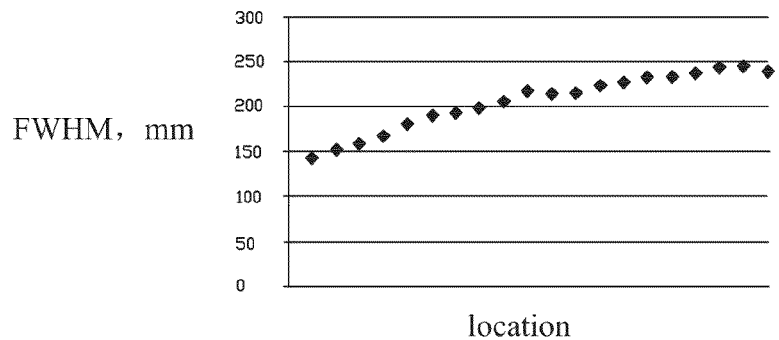
Fig. 5 (Prior Art)
| 1.93% | 3.91% | 5.11% |
| 1.50% | 3.92% | 6.30% |
| 3.38% | 8.83% | 14.55% |
Fig. 6 (Prior Art)

70

LIGHT GUIDE PLATE FOR 3D DISPLAYING

BACKGROUND OF THE INVENTION

1. Field of the Invention

The present invention relates to liquid crystal displaying techniques, and in particular to a light guide plate for 3D displaying.

2. The Related Arts

The increasingly improved performance of LED (Light-Emitting Diode) brings continuous progress of LED backlighting for television, from the very initial four-side light incidence, to two-side light incidence, and then to single-side light incidence. The contemporary development and future direction of progress are set in single short edge light incidence.

Further, with the progress of 3D technology, 3D displaying function is now the main stream. The commonly known 3D displaying modes include shutter glass and film-type patterned retarder (FPR).

The shutter glass 3D displaying is effected with scanning backlight in combination with panel pixel scanning. Backlighting is often sectionalized so that a side-edge LED light bar is divided into multiple sections. When a first frame signal of a panel is applied to scan the first section, the LEDs of the first section are lit, while the remaining is set off. When the panel signal scans the second section, only the LEDs of the second section are lit. This is also applied to other sections. Such an operation is carried out for each frame. The performance of the shutter glass 3D displaying is assessed according to cross-talking among sections. The lower the cross-talking is, the better the displaying result will be. Cross-talking is generally determined according to cross talk among the backlight sections and design of timing sequence.

Cross-talking among backlight sections generally comes from the influence of brightness among different sections and the best situation is that when one section is lit, the backlighting of all the remaining sections shows darkness. As shown in FIG. 1, a side elevational view of a conventional light guide plate with upper microstructures is illustrated. Forming serrated microstructures on the upper or lower surface of a light guide plate is a commonly known design. FIG. 1 is made for observation of light guide plate 10 from the side where light gets incident. The upper surface of the light guide plate 10 forms upper microstructures 11 distributed on the upper surface of the light guide plate 10 in a successive raising-recessing-alternating arrangement in a direction perpendicular to the propagation direction of light in the light guide plate 10, whereby the geometric variation on the upper surface of the light guide plate is useful to eliminate the conditions for occurrence of total reflection. As shown in FIG. 2, a schematic view illustrating difference of light shape between a conventional flat light guide plate and an upper-microstructured light guide plate is given. Although FIG. 2 illustrates that the light shape of the upper-microstructured light guide plate 20 shows more confined light shape than a flat light guide plate 21, yet actually, even though light in the upper-microstructured light guide plate 20 is partially confined, it gets diverging to some extents.

With the increase of the propagation distance, the divergence of the light shape gets greater and shows severer influence on other sections. As shown in FIG. 3, a schematic view showing the distribution of light field of a well known upper-microstructured light guide plate 30 for the condition of one section being lit is given. When one section of the upper-microstructured light guide plate 30 is lit, the light shape is getting divergent with distance. Referring to FIG. 4, which is a schematic view showing the distribution of brightness in a vertical direction for the light shape shown in FIG. 3, the brightness distribution in the vertical direction can be indicated by full width at half maximum (FWHM), left side being the light incidence side. Referring to FIG. 5, which is a schematic view showing the variation of the width for half brightness at different locations with respect to the distance, in a single short edge light incidence, FWHM shows a trend of getting wider with the increase of distance. In other words, for single short edge light incidence, the remote side shows severer cross-talking than the light incidence side. Referring to FIG. 6, a schematic view illustrating the distribution of cross-talking for 9 points on a backlight module including the upper-microstructured light guide plate of FIG. 3 in a 3D mode is given. The left hand side of FIG. 6 is the light incidence side and it is clear that the remote side has severer cross-talking.

SUMMARY OF THE INVENTION

Thus, an object of the present invention is to provide a light guide plate for 3D displaying, which realizes homogeneity of cross-talking at different locations during backlight scanning.

To achieve the above object, the present invention provides a light guide plate for 3D displaying, which comprises upper microstructures forming an upper surface of the light guide plate. The upper microstructures are distributed on the light guide plate in a successive convex-concave alternating arrangement in a direction perpendicular to propagation direction of light emitting from a light source traveling in the light guide plate. Locations on the light guide plate are divided according to the distance from the light source in the propagation direction of the light to a proximal side and a remote side. With H indicating height of shape features of the upper microstructures and P indicating spacing between the shape features of the upper microstructures, the shape features of the upper microstructures show a distribution that is variable in the light propagation direction in such a way that the variation satisfies the condition that aspect ratio H/P of the upper microstructures at the proximal side of the light guide plate is less than aspect ratio H/P of the upper microstructures at the remote side of the light guide plate.

Wherein, the upper microstructures of the light guide plate are of a fixed height and spacing between the upper microstructures of the light guide plate at the proximal side is greater than spacing between the upper microstructures of the light guide plate at the remote side.

Wherein, the upper microstructures of the light guide plate are of a fixed spacing between upper microstructures and height of the upper microstructures of the light guide plate at the proximal side is less than height of the upper microstructures of the light guide plate at the remote side.

Wherein, the upper microstructures of the light guide plate are of non-fixed height and spacing and aspect ratio H/P of the upper microstructures of the light guide plate at the proximal side is less than aspect ratio H/P of the upper microstructures of the light guide plate at the remote side.

Wherein, the variation of the distribution of the shape features of the upper microstructures in the light propagation direction comprises an abrupt change.

Wherein, the variation of the distribution of the shape features of the upper microstructures in the light propagation direction comprises a gradual change.

Wherein, location where the variation of the distribution of the shape features of the upper microstructures in the light propagation direction is made is not fixed.

Wherein, the variation of the distribution of the shape features of the upper microstructures in the light propagation direction is made is made at a center of the light guide plate.

Wherein, the upper microstructures comprise serrated upper microstructures.

Wherein, the upper microstructures comprise wavy upper microstructures.

The present invention also provides a light guide plate for 3D displaying, which comprises upper microstructures forming an upper surface of the light guide plate, the upper microstructures being distributed on the light guide plate in a successive convex-concave alternating arrangement in a direction perpendicular to propagation direction of light emitting from a light source traveling in the light guide plate, locations on the light guide plate being divided according to the distance from the light source in the propagation direction of the light to a proximal side and a remote side, wherein with H indicating height of shape features of the upper microstructures and P indicating spacing between the shape features of the upper microstructures, the shape features of the upper microstructures show a distribution that is variable in the light propagation direction in such a way that the variation satisfies the condition that aspect ratio H/P of the upper microstructures at the proximal side of the light guide plate is less than aspect ratio H/P of the upper microstructures at the remote side of the light guide plate;

wherein the upper microstructures of the light guide plate are of a fixed height and spacing between the upper microstructures of the light guide plate at the proximal side is greater than spacing between the upper microstructures of the light guide plate at the remote side;

wherein the variation of the distribution of the shape features of the upper microstructures in the light propagation direction comprises an abrupt change; and wherein the upper microstructures comprise serrated upper microstructures.

The light guide plate for 3D displaying according to the present invention realizes homogeneity of cross-talking at different locations during backlight scanning, and particularly realizing reduction of cross-talking at a remote side so as to improve overall performance of 3D displaying.

BRIEF DESCRIPTION OF THE DRAWINGS

The technical solution, as well as beneficial advantages, will be apparent from the following detailed description of embodiments of the present invention, with reference to the attached drawings. In the drawings:

FIG. 4 is a schematic view showing the distribution of brightness in a vertical direction for the light shape shown in FIG. 3;

FIG. 5 is a schematic view showing the variation of the width for half brightness at different locations with respect to the distance;

FIG. 6 is a schematic view illustrating the distribution of cross-talking for 9 points on a backlight module including the upper-microstructured light guide plate of FIG. 3 in a 3D mode;

DETAILED DESCRIPTION OF THE PREFERRED EMBODIMENTS

Figure 1:
FIG. 1 is a side elevational view of a conventional light guide plate with upper microstructures.
Figure 2:
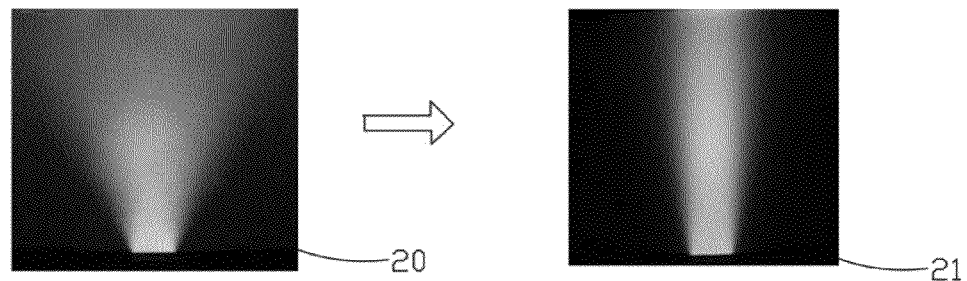
FIG. 2 is a schematic view illustrating difference of light shape between a conventional flat light guide plate and a light guide plate with upper microstructures.
Figure 3:
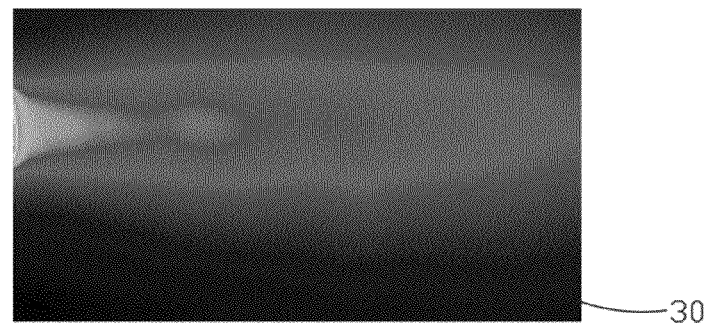
FIG. 3 is a schematic view showing the distribution of light field of a well known upper-microstructured light guide plate for the condition of one section being lit.
Figure 7A:
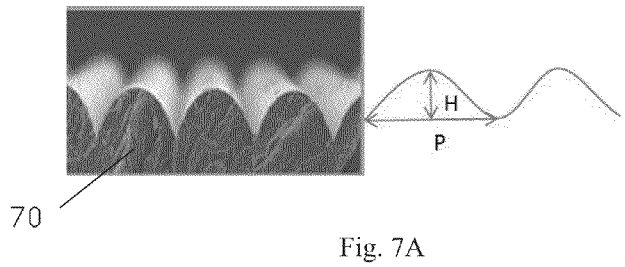
FIGS. 7A and 7B are schematic views illustrating the principle of a light guide plate for 3D displaying according to the present invention.
Figure 7B:
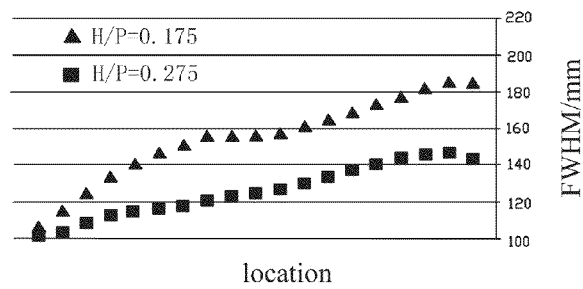

Referring to FIGS. 7A and 7B, which are schematic views illustrating the principle of a light guide plate for 3D displaying according to the present invention, as shown in FIG. 7A, the light guide plate for 3D displaying according to the present invention comprises upper microstructures 70 that serve as an upper surface of the light guide plate. When observed from the side where a light source, namely an LED light bar, is located, the upper microstructures 70 are distributed on the light guide plate in a successive convex-concave-alternating arrangement in a direction perpendicular to propagation direction of light that emits from the light source traveling in the light guide plate. The upper microstructures 70 can be in the form of serration or waves. The locations on the light guide plate are divided, according to the distance from the light source in the propagation direction of light, to proximal side and remote side. The symbol H indicates the height of the shape features of the upper microstructures 70 and P (Pitch) indicates spacing of the shape features of the upper microstructures 70. The shape features of the upper microstructures 70 show a distribution that is variable in the light propagation direction in such a way that the variation satisfies the condition that the aspect ratio H/P of the upper microstructures 70 at the proximal side of the light guide plate is less than the aspect ratio H/P of the upper microstructures 70 at the remote side of the light guide plate. In FIG. 7A, H and P are used to represent the shape features of the upper microstructures 70, in which H indicates height difference between convexes and concaves and P indicates the length of period of the convexes and concaves, namely the distance between two concaves. However, substitution can be made with other parameters to represent the shape features of the upper microstructures 70, such as P being representative of the distance between convex and concave.

As shown in FIG. 7B, the greater the aspect ratio H/P of the upper microstructures is, the greater the capability of converging light will be. When H/P=0.275, the variation of width for half brightness at different locations is apparently more convergent than that associated with H/P=0.175. Thus, to realize homogeneity of cross-talking at different locations between sections during backlight scanning and to realize uniform distribution of cross-talking in a single short edge light incidence 3D module and to improve the result of 3D displaying, the preset invention provides a unique distribution of the shape features of the upper microstructures 70 in the light propagation direction to make the aspect ratio H/P of the microstructures of the light guide plate at the proximal side less than the aspect ratio H/P at the remote side.

Figure 8:
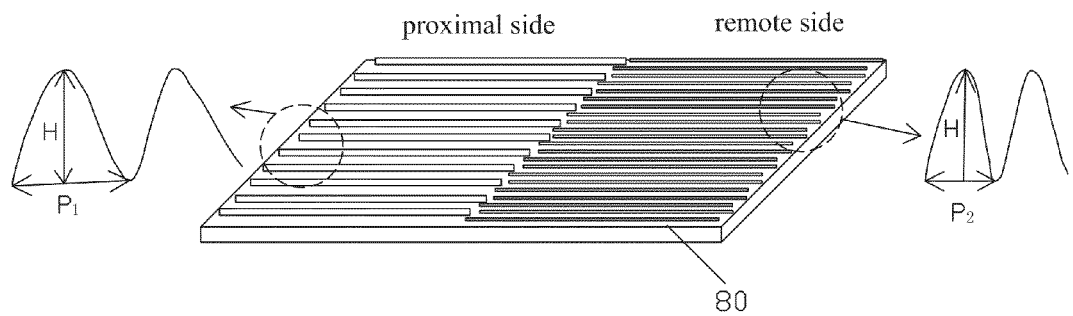
FIG. 8 is a perspective view showing a first preferred embodiment of the light guide plate for 3D displaying according to the present invention.

As shown in FIG. 8, which is a perspective view showing a first preferred embodiment of the light guide plate for 3D displaying according to the present invention, in this preferred embodiment, the upper microstructures of the light guide plate 80 are of the same height and the spacing between the upper microstructures of the light guide plate 80 at the proximal side is greater than the spacing between the upper microstructures of the light guide plate 80 at the remote side. As shown in FIG. 8, the height of the upper microstructures is H and the spacing of the upper microstructures at the proximal side, $P_1$, is greater than the spacing of the upper microstructures at the remote side, $P_2$.

Figure 9:
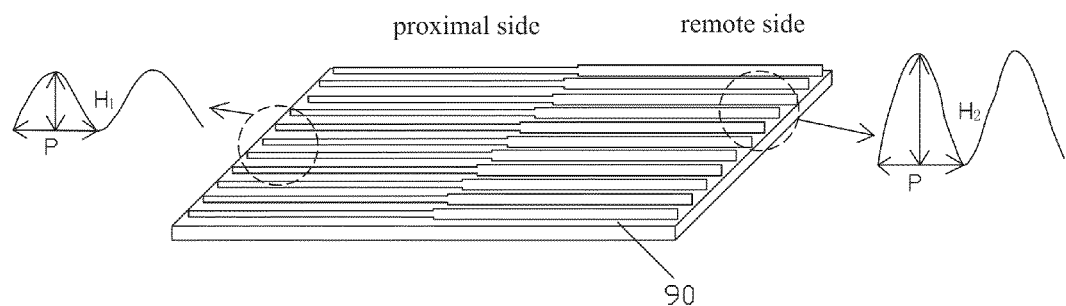
FIG. 9 is a perspective view showing a second preferred embodiment of the light guide plate for 3D displaying according to the present invention.

As shown in FIG. 9, which is a perspective view showing a second preferred embodiment of the light guide plate for 3D displaying according to the present invention, in this preferred embodiment, the upper microstructures of the light guide plate 90 are of the same spacing and the height of the upper microstructures of the light guide plate 90 at the proximal side is less than the height of the upper microstructures of the light guide plate 90 at the remote side. As shown in FIG. 9, the spacing between the upper microstructures is P and the height of the upper microstructures at the proximal side, $H_1$, is less than the height of the upper microstructures at the remote side, $H_2$.

Figure 10:
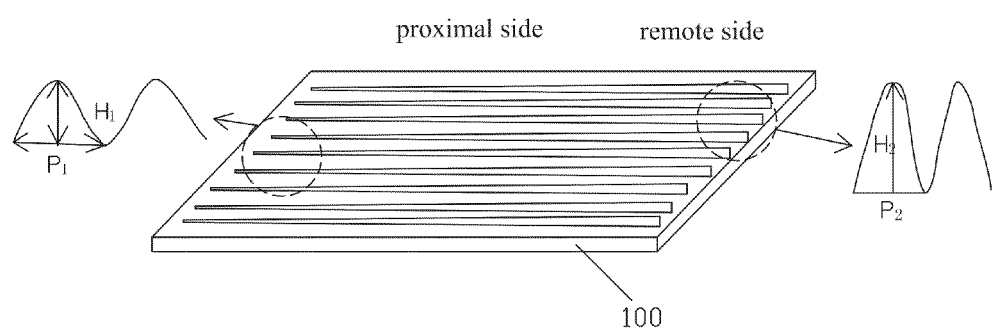
FIG. 10 is a perspective view showing a third preferred embodiment of the light guide plate for 3D displaying according to the present invention.

As shown in FIG. 10, which is a perspective view showing a third preferred embodiment of the light guide plate for 3D displaying according to the present invention, in this preferred embodiment, both the height and spacing of the upper microstructures of the light guide plate 100 are not fixed. The aspect ratio H/P of the upper microstructures of the light guide plate 100 at the proximal side is less than the aspect ratio H/P of the upper microstructures of the light guide plate 100 at the remote side. As shown in FIG. 10, $H_1/P_1$ at the proximal side is less than $H_2/P_2$ at the remote side.

The variation of the aspect ratio H/P reflects the variation of the shape features of the upper microstructures. The present invention makes advantage of the variation of the shape features to realize homogeneity of cross-talking at different locations between sections during backlight scanning. Those having ordinary skill in the art may appreciate that variations that can be made on the shape features of the upper microstructures are not limited to the abrupt change illustrated in FIGS. 8 and 9 and the gradual change illustrated in FIG. 10 and the location where the variations are made can be varying, such as at a center of the light guide plate or at other locations.

In summary, the present invention uses modification of the pattern of upper microstructures to realize homogeneity of cross-talking at different location during backlight scanning, and particularly realizing reduction of cross-talking at remote side to thereby improve overall performance of 3D displaying.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A light guide plate for 3D (3-dimensional) displaying, comprising upper microstructures forming an upper surface of the light guide plate, the upper microstructures being distributed on the light guide plate in a successive convex-concave alternating arrangement in a direction perpendicular to propagation direction of light emitting from a light source traveling in the light guide plate, locations on the light guide plate being divided according to the distance from the light source in the propagation direction of the light to a proximal side and a remote side, wherein with H indicating height of shape features of the upper microstructures and P indicating spacing between the shape features of the upper microstructures, the shape features of the upper microstructures show a distribution that is variable in the light propagation direction in such a way that the variation satisfies the condition that aspect ratio H/P of the upper microstructures at the proximal side of the light guide plate is less than aspect ratio H/P of the upper microstructures at the remote side of the light guide plate;
wherein the upper microstructures of the light guide plate are of a fixed height and spacing between the upper microstructures of the light guide plate at the proximal side is greater than spacing between the upper microstructures of the light guide plate at the remote side.

2. The light guide plate for 3D displaying as claimed in claim 1, wherein the variation of the distribution of the shape features of the upper microstructures in the light propagation direction comprises an abrupt change.

3. The light guide plate for 3D displaying as claimed in claim 1, wherein the variation of the distribution of the shape features of the upper microstructures in the light propagation direction comprises a gradual change.

4. The light guide plate for 3D displaying as claimed in claim 1, wherein location where the variation of the distribution of the shape features of the upper microstructures in the light propagation direction is made is not fixed.

5. The light guide plate for 3D displaying as claimed in claim 4, wherein the variation of the distribution of the shape features of the upper microstructures in the light propagation direction is made at a center of the light guide plate.

6. The light guide plate for 3D displaying as claimed in claim 1, wherein the upper microstructures comprise serrated upper microstructures.

7. The light guide plate for 3D displaying as claimed in claim 1, wherein the upper microstructures comprise wavy upper microstructures.

8. A light guide plate for 3D (3-dimensional) displaying, comprising upper microstructures forming an upper surface of the light guide plate, the upper microstructures being distributed on the light guide plate in a successive convex-concave alternating arrangement in a direction perpendicular to propagation direction of light emitting from a light source traveling in the light guide plate, locations on the light guide plate being divided according to the distance from the light source in the propagation direction of the light to a proximal side and a remote side, wherein with H indicating height of shape features of the upper microstructures and P indicating spacing between the shape features of the upper microstructures, the shape features of the upper microstructures show a distribution that is variable in the light propagation direction in such a way that the variation satisfies the condition that aspect ratio H/P of the upper microstructures at the proximal side of the light guide plate is less than aspect ratio H/P of the upper microstructures at the remote side of the light guide plate;
wherein the upper microstructures of the light guide plate are of a fixed height and spacing between the upper microstructures of the light guide plate at the proximal side is greater than spacing between the upper microstructures of the light guide plate at the remote side;
wherein the variation of the distribution of the shape features of the upper microstructures in the light propagation direction comprises an abrupt change; and
wherein the upper microstructures comprise serrated upper microstructures.

9. A light guide plate for 3D (3-dimensional) displaying, comprising upper microstructures forming an upper surface of the light guide plate, the upper microstructures being distributed on the light guide plate in a successive convex-concave alternating arrangement in a direction perpendicular to propagation direction of light emitting from a light source traveling in the light guide plate, locations on the light guide plate being divided according to the distance from the light source in the propagation direction of the light to a proximal side and a remote side, wherein with H indicating height of shape features of the upper microstructures and P indicating spacing between the shape features of the upper microstructures, the shape features of the upper microstructures show a distribution that is variable in the light propagation direction in such a way that the variation satisfies the condition that aspect ratio H/P of the upper microstructures at the proximal side of the light guide plate is less than aspect ratio H/P of the upper microstructures at the remote side of the light guide plate;

wherein the variation of the distribution of the shape features of the upper microstructures in the light propagation direction comprises an abrupt change.

10. The light guide plate for 3D displaying as claimed in claim 9, wherein the upper microstructures of the light guide plate are of a fixed height and spacing between the upper microstructures of the light guide plate at the proximal side is greater than spacing between the upper microstructures of the light guide plate at the remote side.

11. The light guide plate for 3D displaying as claimed in claim 9, wherein the upper microstructures of the light guide plate are of non-fixed height and spacing and aspect ratio H/P of the upper microstructures of the light guide plate at the proximal side is less than aspect ratio H/P of the upper microstructures of the light guide plate at the remote side.

12. The light guide plate for 3D displaying as claimed in claim 9, wherein the upper microstructures comprise serrated upper microstructures.

13. A light guide plate for 3D (3-dimensional) displaying, comprising upper microstructures forming an upper surface of the light guide plate, the upper microstructures being distributed on the light guide plate in a successive convex-concave alternating arrangement in a direction perpendicular to propagation direction of light emitting from a light source traveling in the light guide plate, locations on the light guide plate being divided according to the distance from the light source in the propagation direction of the light to a proximal side and a remote side, wherein with H indicating height of shape features of the upper microstructures and P indicating spacing between the shape features of the upper microstructures, the shape features of the upper microstructures show a distribution that is variable in the light propagation direction in such a way that the variation satisfies the condition that aspect ratio H/P of the upper microstructures at the proximal side of the light guide plate is less than aspect ratio H/P of the upper microstructures at the remote side of the light guide plate;

wherein location where the variation of the distribution of the shape features of the upper microstructures in the light propagation direction is made is not fixed.

14. The light guide plate for 3D displaying as claimed in claim 13, wherein the variation of the distribution of the shape features of the upper microstructures in the light propagation direction is made at a center of the light guide plate.

15. The light guide plate for 3D displaying as claimed in claim 13, wherein the upper microstructures of the light guide plate are of a fixed height and spacing between the upper microstructures of the light guide plate at the proximal side is greater than spacing between the upper microstructures of the light guide plate at the remote side.

16. The light guide plate for 3D displaying as claimed in claim 13, wherein the upper microstructures comprise serrated upper microstructures.

17. A light guide plate for 3D (3-dimensional) displaying, comprising upper microstructures forming an upper surface of the light guide plate, the upper microstructures being distributed on the light guide plate in a successive convex-concave alternating arrangement in a direction perpendicular to propagation direction of light emitting from a light source traveling in the light guide plate, locations on the light guide plate being divided according to the distance from the light source in the propagation direction of the light to a proximal side and a remote side, wherein with H indicating height of shape features of the upper microstructures and P indicating spacing between the shape features of the upper microstructures, the shape features of the upper microstructures show a distribution that is variable in the light propagation direction in such a way that the variation satisfies the condition that aspect ratio H/P of the upper microstructures at the proximal side of the light guide plate is less than aspect ratio H/P of the upper microstructures at the remote side of the light guide plate;

wherein the upper microstructures comprise wavy upper microstructures.

* * * * *